US007253769B2

United States Patent
Leblond

(10) Patent No.: US 7,253,769 B2
(45) Date of Patent: Aug. 7, 2007

(54) METHOD FOR THE ELIMINATION IN A RECEIVER OF INCIDENT BEAMS RESULTING FROM MULTIPATHS, AND DEVICE FOR IMPLEMENTATION

(75) Inventor: Valéry Leblond, Valence (FR)

(73) Assignee: Thales, Neuilly sur Seine (FR)

( * ) Notice: Subject to any disclaimer, the term of this patent is extended or adjusted under 35 U.S.C. 154(b) by 60 days.

(21) Appl. No.: 10/494,420

(22) PCT Filed: Nov. 22, 2002

(86) PCT No.: PCT/FR02/04018

§ 371 (c)(1),
(2), (4) Date: May 5, 2004

(87) PCT Pub. No.: WO03/044987

PCT Pub. Date: May 30, 2003

(65) Prior Publication Data

US 2005/0179590 A1 Aug. 18, 2005

(30) Foreign Application Priority Data

Nov. 23, 2001 (FR) .................................. 01 15195

(51) Int. Cl.
*G01S 3/16* (2006.01)
(52) U.S. Cl. ...................................... 342/378; 342/442
(58) Field of Classification Search ................ 342/378, 342/417, 442, 443; 455/63, 65
See application file for complete search history.

(56) References Cited

U.S. PATENT DOCUMENTS

| 6,008,759 A | * | 12/1999 | Tangemann et al. | ........ 342/368 |
| 6,078,788 A | * | 6/2000 | Haardt | ........................ 455/65 |
| 6,175,327 B1 | | 1/2001 | Lin et al. | |
| 6,597,316 B2 | * | 7/2003 | Rao et al. | ............ 343/700 MS |
| 6,853,961 B2 | * | 2/2005 | Chevalier et al. | ........... 702/196 |

FOREIGN PATENT DOCUMENTS

JP          59 114907 A          10/1984

OTHER PUBLICATIONS

Zoltowski M D et al: "Advanced adaptive null steering concepts for GPS" Military Communications Conference , 1995. Nov. 5, 1995 pp. 1214-1218.

* cited by examiner

*Primary Examiner*—Dao L. Phan
(74) *Attorney, Agent, or Firm*—Lowe Hauptman & Berner, LLP

(57) ABSTRACT

Method for the elimination in a receiver of an incident signal resulting from multipaths, characterized in that an array of 2n auxiliary sensors (2, 3, Ca to Cf), with n≧3, is constructed around an antenna main sensor (1), these auxiliary sensors all being equidistant from the main sensor and regularly spaced apart, and, by successively taking the pairs of auxiliary sensors symmetric with respect to the main sensor to determine the direction of arrival of the signal resulting from the multipaths, the weighted combination of the signals arising from the n sensors is performed, the direction of the transmitter being known ($e^{j\Phi_i}$).

9 Claims, 2 Drawing Sheets ed States Patent

METHOD FOR THE ELIMINATION IN A RECEIVER OF INCIDENT BEAMS RESULTING FROM MULTIPATHS, AND DEVICE FOR IMPLEMENTATION

BACKGROUND OF THE INVENTION

1. Field of the Invention

The present invention relates to a method for the elimination, in a receiver, of incident beams resulting from multipaths, and to a device for implementing this method.

2. Description of the Related Art

Systems which nowadays make it possible to strengthen resistance to multipaths in radionavigation receivers are most of the time based on the use of more or less particular correlators (narrow correlator, double delta correlator, etc.), making it possible to ignore multipaths delayed by a greater or lesser distance, always less than twice the chip length of the pseudorandom code used T, that is to say the period of the clock signals of the codes of the radionavigation signals (for example, for signals of the "Global Positioning System", GPS type, 1 chip=1 μs in C/A code, i.e. ~300 m, or 100 ns in P code, i.e. ~30 m). Nevertheless, for multipaths with small delays relative to the chip length, these correlators turn out to be inefficient.

U.S. Pat. No. 6,175,327 discloses a method for the elimination of interference in receivers of GPS radionavigation signals. This method uses a power inversion technique that calls upon an array of n antennas whose signals are individually weighted by inversion of a cross-correlation matrix and use of a canonical constraint not representing a particular reception direction, but a criterion of "minimization of the power received taking account of all the directions in space". This known method for eliminating interference is applicable only to signals whose power referred to each sensor is greater than the level of power due to thermal noise. Furthermore, this processing is carried out without prior knowledge of the direction of arrival of the signal that one wishes to eliminate. It is therefore impossible with this known method alone to determine the direction of arrival of one or more signals due to multipaths, or to eliminate them: their power level referred to the input of the receiver is in fact lower than the power level of the main signal (direct path), the power level of which is itself smaller than that of the thermal noise generated in the spectral processing band (passband at the input of the receiver).

An object of the present invention is a method making it possible to eliminate on reception a signal due to multipaths and coming from a direction other than that of the transmitter, whatever its delay with respect to the signal coming directly from the transmitter.

SUMMARY OF THE INVENTION

The method of the invention is a method for determining the direction of arrival and then for the elimination, in a receiver, of an incident signal resulting from multipaths, of received power, in the spectral processing band, smaller than that of the thermal noise of the receiver; it is applied to an antenna constructed around an antenna main sensor and comprising an array of auxiliary sensors, these auxiliary sensors all being equidistant from the main sensor and regularly spaced apart. The method is characterized in that the array of auxiliary sensors comprises 2n auxiliary sensors, with n≧3, and, that by successively taking the pairs of auxiliary sensors symmetric with respect to the main sensor to determine the direction of arrival of the signal resulting from the multipaths, the weighted combination of the signals arising from the n sensors is performed, the direction of the transmitter of useful signals being known.

BRIEF DESCRIPTION OF THE DRAWINGS

The present invention will be better understood on reading the detailed description of a mode of implementation, taken by way of non-limiting example and illustrated by the appended drawing, in which.

DETAILED DESCRIPTION OF A PREFERRED EMBODIMENT

Figure 1:
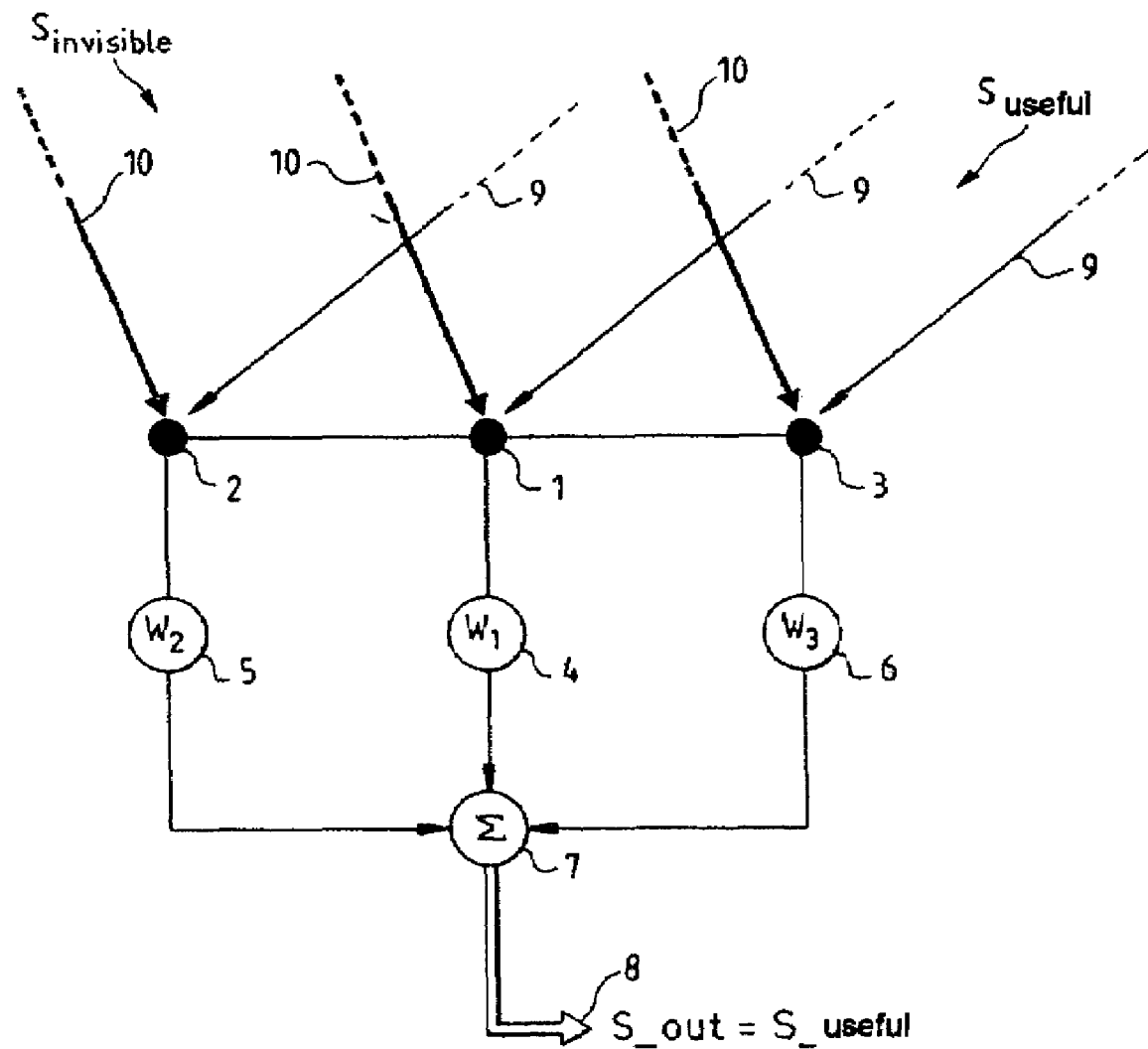
FIG. 1 is a basic diagram illustrating the processing method in accordance with the invention.

Illustrated in a very simplified manner in FIG. 1 is the implementation of the main characteristics of the method of the invention. This method is applied, in the present case, to radionavigation signals transmitted by a satellite, such as a GPS satellite, forming part of a constellation of positioning satellites, but it is of course understood that the invention is not limited to this application alone, and that it may be implemented in other applications, for example the reception of signals transmitted by terrestrial transmitters, on condition that the direction in which these transmitters are situated with respect to the place of reception is known.

Represented in FIG. 1 is a main sensor 1 and two auxiliary sensors 2, 3 that are aligned with the sensor 1 and disposed symmetrically with respect to the latter. Each of the sensors 1 to 3 is linked to a complex weighting circuit, respectively 4 to 6. The three circuits 4 to 6 are linked to a summator circuit 7, at the output 8 of which is gathered a signal $S_{-Out}$ that comprises the useful signal only, that is to say a signal coming directly from the transmitter of the satellite, not affected by stray signals that are due to multiple reflections of the signal from the transmitter on various obstacles and that reach the various sensors with the useful signal. Represented in FIG. 1 in the form of arrowed half-lines 9 is the direction of arrival of the direct paths of the waves between the transmitter (for example a satellite in the case of GPS signals) and the sensors 1 to 3. Likewise, represented in the form of arrowed half-lines 10 is the direction of arrival of an indirect path (that is to say after one or more reflections) between the transmitter of the aforesaid satellite and the same sensors 1 to 3. The method of the invention consists in eliminating any beam arriving in the direction other than the direction of the beams 9, by processing using the signals received by the auxiliary sensors. This processing consists essentially in combining in a weighted manner the signals of these auxiliary sensors with the signal of the main sensor 1. The determination of the weighting coefficients can be carried out by algorithms of the "constrained power inversion" type, or according to the "direct" procedure described in detail below, with reference to FIG. 2. In all cases, the method described below for determining the direction of incidence of the signal arising from multipaths will be used.

Figure 2:
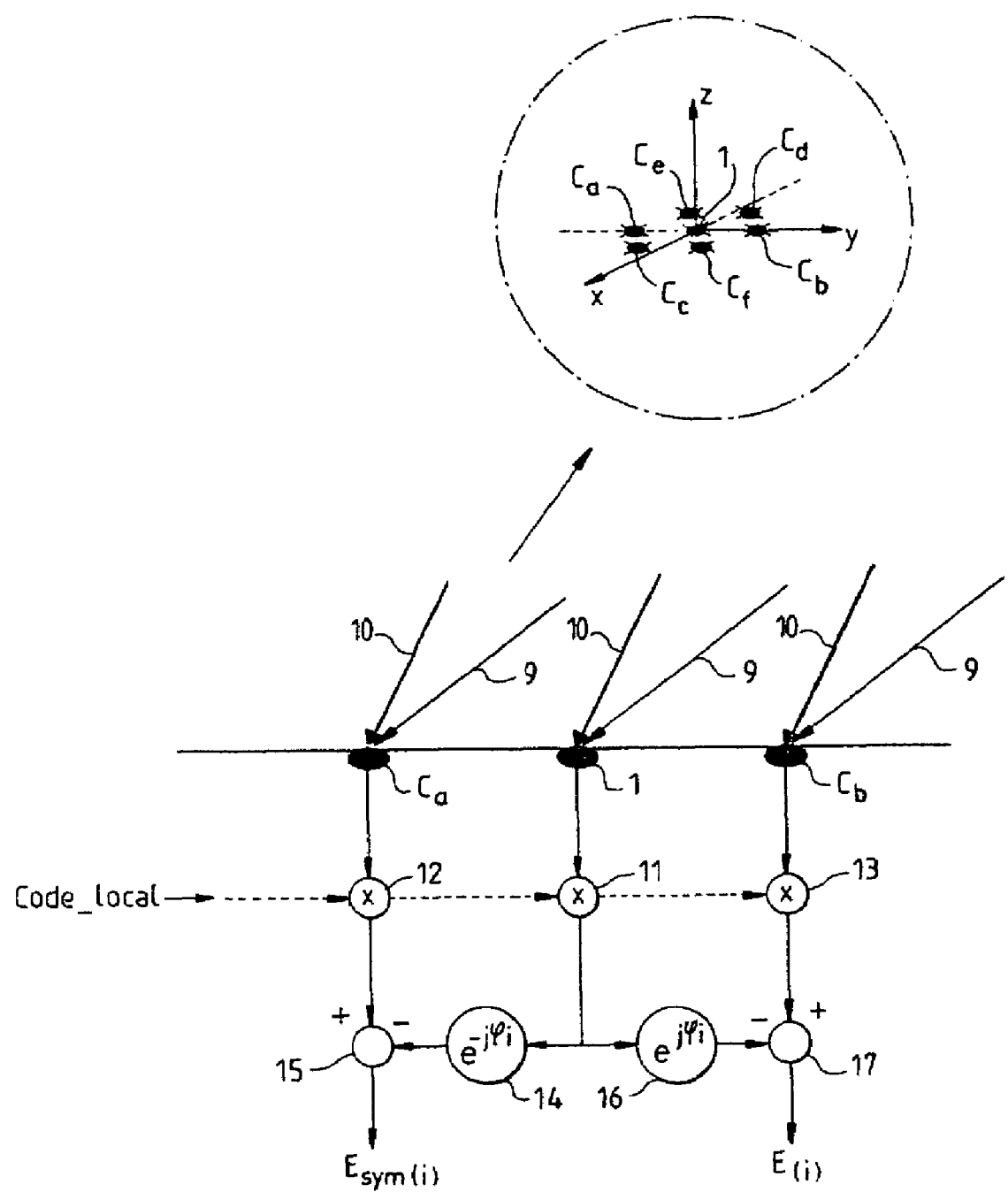
FIG. 2 is a diagram showing in slightly greater detail than FIG. 1 the method of processing the signals arising from the auxiliary sensors, in accordance with the invention.

Represented in FIG. 2 are the main sensor 1 and two auxiliary sensors Ca, Cf aligned with the sensor 1. These sensors form part of the six auxiliary sensors Ca to Cf surrounding the sensor 1. All these sensors are, in the present case, situated on a circle, centered on the sensor 1 and regularly spaced over this circle.

Let $\phi_i = \vec{k_{direct}} \cdot \vec{IC_a}$ with $\vec{k_{direct}}$ the wave vector of the direct incident signal. Let $?_i = \vec{k_{stray}} \cdot \vec{IC_a}$ with $\vec{k_{stray}}$ the wave vector of the stray incident signal (due to multiple reflections of the beam of the relevant satellite). The direct signal from the satellite is received on the sensor Ca with a phase shift $e^{j\Phi_i}$ with respect to the direct signal received on the central sensor 1. The stray signal is for its part received on the sensor Ca with a phase shift $e^{j\Phi_i}$ with respect to the stray signal received on the central sensor 1.

As indicated in FIG. 2, the signals of sensors 1 and Ca are correlated (multiplied) at 11 and 12 respectively with the local PRN code (computed in the receiver). The result of the correlation at 11 is endowed at 14 with a phase shift $e^{j\Phi_i}$ and subtracted at 15 from the result of the correlation coming from 12. The result of the subtraction at 15 gives $E_i$. Thus, the value of the expression $E_i = \chi_i - e^{j\Phi_i} \cdot \chi_o$, is obtained for each of the auxiliary sensors Ca, Cb, Cc, Cd, Ce and Cf, in which expression $\chi_i$ is the result of the correlation between the code of the signal received on sensor $C_i$ (with i ranging from a to f) and the local code, $\chi_o$ being the result of the correlation between the code of the signal received on sensor 1 and the local code.

We call $S_i$ the signal received on sensor $C_i$, $S_o$ the signal received on sensor 1 (the signal received comprises the signal of the direct beam and the signal of the stray beam), $A_{gps}$ the amplitude of the direct signal contained in $S_i$, $code_{gps}$ and $code_{mul}$ the PRN codes of the signal of the direct beam and of the stray beam (these are obviously the same codes phase shifted with respect to one another), (a) the amplitude attenuation factor of the stray signal received during all the reflections that it has undergone and Ω the overall phase rotation undergone by the stray signal during these same reflexions. We then obtain:

$$E_i = (S_i - e^{j\varphi_i} \cdot S_o) \otimes code_{local}$$
$$= (A_{gps} \cdot (code_{gps} \cdot e^{j\varphi_i} + a \cdot code_{mul} \cdot e^{jO} \cdot e^{j?_i}) -$$
$$e^{j\varphi_i} \cdot A_{gps} \cdot (code_{gps} + a \cdot code_{mul} \cdot e^{jO}) + noise) \otimes code_{local}$$
$$= (A_{gps} \cdot a \cdot code_{mul} \cdot e^{jO} \cdot (e^{j?_i} - e^{j\varphi_i})) \otimes code_{local} +$$
$$noise \otimes code_{local}$$
$$= (A_{gps} \cdot a \cdot code_{mul} \cdot e^{jO} \cdot e^{j\varphi_i}(e^{j(?_i-\varphi_i)} - 1)) \otimes code_{local} + 0$$
$$= \left(A_{gps} \cdot a \cdot e^{j\Omega} \cdot e^{j(\frac{\psi_i+\varphi_i}{2})} \cdot 2j \cdot \sin\left(\frac{\psi_i - \varphi_i}{2}\right)\right) \cdot (code_{mul} \otimes code_{local})$$

In these expressions, the sign represents the correlation (or multiplication) operation.

The expression $E_{sym(i)}$ can be obtained likewise by applying the same type of calculation not to the point $C_i$ but to the point $C_{sym(i)}$ (for example, if si i=a, sym(i)=f).

If we then evaluate the following expression $Ratio_i$:

$$Ratio_i = \frac{E_i}{E_{sym(i)}} \cdot \frac{-1}{e^{j\varphi_i}}$$

We obtain:

$Ratio_i = e^{j\psi_i}$

This signifies that we thus obtain the value $e^{j\psi_i}$ of the phase shift induced by the array of sensors at the location of sensor $C_i$, on the path of the stray beam, this amounting to identifying the direction of incidence of this stray beam.

Next, the signals coming from the n sensors (n=7 in the present case) are combined in a weighted manner, for example a combination by addition. The weighting coefficient of the signal gathered by the central sensor is $-(n-1)$, while the signal gathered by each of the auxiliary sensors (i) is given the coefficient equal to $Ratio_{sym(i)}$. In this way, the signal due to the stray beam is eliminated from the signal resulting from the weighted combination.

According to a variant of the method of the invention, instead of the weighted combination described above, a method of constrained power inversion is implemented using fictitiously during the numerical calculation at input a numerical representation of a very powerful narrowband signal in the direction of arrival of the multipath beam. As mentioned above, a preferred application of the method of the invention is the processing of signals from radionavigation satellites, which processing requires that seven correlations and weightings be carried out on the signals received, together with a customary correlation on the reconstituted signal (after the weighted combinings) so that this reconstituted signal can be used conventionally by the standard signal processing device of the radionavigation receiver used. Of course, this method presupposes that the direction of the satellite tracked is known, that is to say that the corresponding values of $e^{j\Phi_i}$ are known (this being true since almanacs and ephemerides are customarily available giving the trajectories of the satellites transmitting the radionavigation signals). This presupposes that there is a very tight bond between the processing of the antenna signals and the radionavigation tracking processing, this also being true if these two processing operations are performed in the same satellite signal receiver.

When dealing with signals transmitted by a terrestrial transmitter and likewise using a method of code measurement type, it is entirely conceivable to use the procedures cited above insofar as the position of the transmitters is known a priori (such is the case for example for fixed transmitting local ground booster stations etc.).

The invention claimed is:

1. A method of eliminating an incident signal resulting from multipaths in a receiver for satellite signals, said incident signal having a received power, in the processing band, which is smaller than that of the thermal noise of the receiver, applied to an antenna constructed around an antenna main sensor and comprising an array of auxiliary sensors, these auxiliary sensors all being equidistant from the main sensor and regularly spaced apart, wherein the array of auxiliary sensors comprises 2n auxiliary sensors, with n≧3 of the method comprising the steps of determining the direction of arrival of the signal resulting from the multipaths by successively taking the pairs of auxiliary sensors symmetric with respect to the main sensor, and performing the weighted combination of the signals arising from the n sensors, the direction of the transmitter being known, and wherein for a number n sensors, a weighting by $-(n-1)$ is performed for the main sensor, and a weighting by $Ratio_{sym(i)}$ is performed for each of the auxiliary sensors of rank i, followed by a summation of all the weighted values, with:

$$Ratio_{(i)} = \frac{E_{(i)}}{E_{sym(i)}} \cdot \frac{-1}{e^{j\phi_i}},$$

in which expression $E(i) = (\chi_i - e^{j\Phi_i} \cdot \chi_o)$, $\chi_i$ being the product between the code of the signal received on sensor i and the local code, $\chi_o$ being the same product for the main sensor, $e^{j\Phi_i}$ being the phase shift induced on the sensor considered by the direct signal, $E_{sym(i)}$ being the value homologous to $E_{(i)}$ for the sensor symmetric to sensor i with respect to the main sensor and $Ratio_{sym(i)}$ the value homologous to $Ratio_{(i)}$ for the sensor symmetric to the sensor i considered with respect to the main sensor.

2. The method as claimed in claim 1, wherein the weighting implements a constrained power inversion method using fictitiously as starting value a very powerful narrowband signal that would come from the direction of arrival of the multipath signal.

3. A device for the elimination, in a receiver, of incident signals resulting from multipaths, comprising:
  an antenna main sensor around which is disposed an array of 2n auxiliary sensors, these sensors being disposed on a circle centered on the main sensor and regularly spaced part, these sensors being linked to weighting circuits and combining circuits,
  wherein the weighting circuit performs for a number n of sensors, a weighting by $-(n-1)$ is performed for the main sensor, and a weighting by $Ratio_{sym(i)}$ is performed for each of the auxiliary sensors of rank i, followed by a summation of all the weighted values, with:

$$Ratio_{(i)} = \frac{E_{(i)}}{E_{sym(i)}} \cdot \frac{-1}{e^{j\phi_i}},$$

in which expression $E(i)=(\chi_i - e^{j\Phi_i} \cdot \chi_o)$, $\chi_i$ being the product between the code of the signal received on sensor i and the local code, $\chi_o$ being the same product for the main sensor, $e^{j\Phi_i}$ being the phase shift induced on the sensor considered by the direct signal, $E_{sym(i)}$ being the value homologous to $E_{(i)}$ for the sensor symmetric to sensor i with respect to the main sensor and $Ratio_{sym(i)}$ the value homologous to $Ratio_{(i)}$ for the sensor symmetric to the sensor i considered with respect to the main sensor.

4. The device of claim 3, wherein the weighting circuit implements a constrained power inversion method using fictitiously as starting value a very powerful narrowband signal that would come from the direction of arrival of the multipath signal.

5. The device of claim 3, wherein $n \geq 3$.

6. A method for eliminating signals resulting from multipaths in a receiver for satellite signals, comprising the steps of:
  determining the direction of travel of the signal resulting from the mulitpaths, by successively taking pairs of auxiliary sensors symmetric with respect to a main sensor,
  performing a weighted combination of the signals arising from the sensors, the direction of the transmitter being known, wherein for a number n of sensors, a weighting by $-(n-1)$ is performed for the main sensor, and a weighting by $Ratio_{sym(i)}$ is performed for each of the auxiliary sensors of rank i, followed by a summation of all the weighted values, with:

$$Ratio_{(i)} = \frac{E_{(i)}}{E_{sym(i)}} \cdot \frac{-1}{e^{j\phi_i}},$$

in which expression $E(i)=(\chi_i - e^{j\Phi_i} \cdot \chi_o)$, $\chi_i$ being the product between the code of the signal received on sensor i and the local code, $\chi_o$ being the same product for the main sensor, $e^{j\Phi_i}$ being the phase shift induced on the sensor considered by the direct signal, $E_{sym(i)}$ being the value homologous to $E_{(i)}$ for the sensor symmetric to sensor i with respect to the main sensor and $Ratio_{sym(i)}$ the value homologous to $Ratio_{(i)}$ for the sensor symmetric to the sensor i considered with respect to the main sensor.

7. The method of claim 6, wherein the weighting implements a constrained power inversion method using fictitiously as starting value a very powerful narrowband signal that would come from the direction of arrival of the multipath signal.

8. A processing method in a receiver of an incident signal transmitted in a known direction by a transmitter, for the elimination of signals arriving on said receiver and resulting from multi-reflections on various obstacles of said incident signal emitted by the transmitter, said processing method being applied to an antenna constructed around an antenna main sensor and comprising an array of auxiliary sensors, these auxiliary sensors all being equidistant from the main sensor and regularly spaced apart, wherein the array of auxiliary sensors comprises 2n auxiliary sensors, with $n \geq 3$, a direction of arrival of a signal different from the known direction of the incident signal is determined by successively taking the pairs of auxiliary sensors symmetric with respect to the main sensor, and a weighted combination of the signals arising from the auxiliary sensors with the signal arising from the main sensor is performed so that any signal received which direction of arrival is different from the said known direction is eliminated.

9. A method according to claim 8, wherein the transmitter is a satellite and the transmitted signal is a radionavigation signal.

* * * * *